April 28, 1953     W. A. BEDFORD, JR     2,636,414
BOLT FASTENER
Filed May 7, 1949
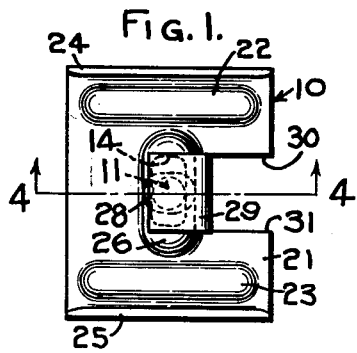
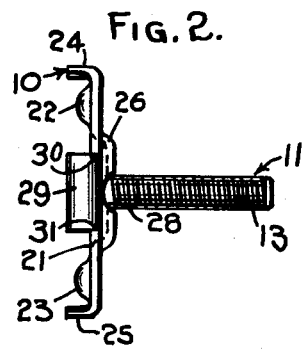
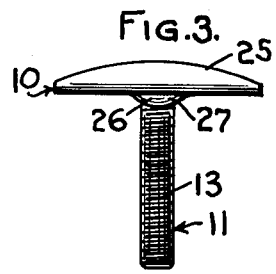
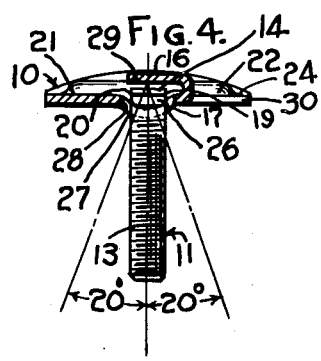
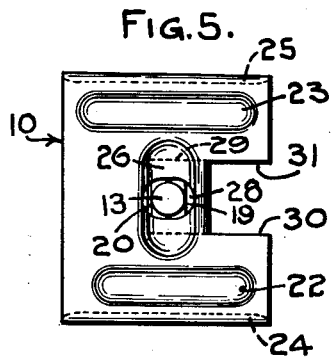
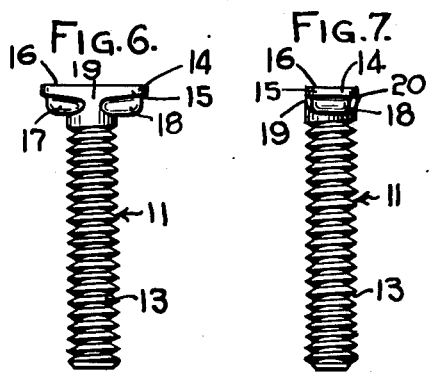
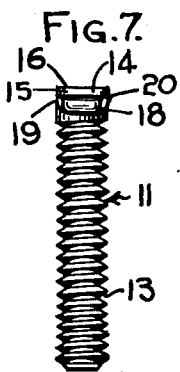
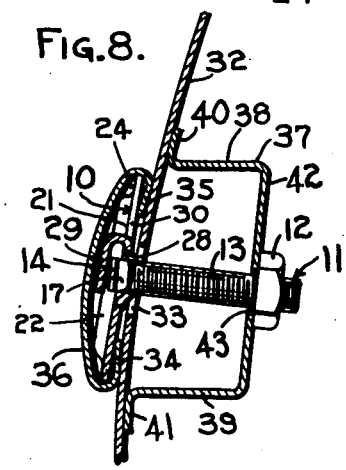
INVENTOR:
WILLIAM A. BEDFORD JR.
BY Philip E. Parker
ATTORNEY.

Patented Apr. 28, 1953

2,636,414

UNITED STATES PATENT OFFICE 2,636,414

BOLT FASTENER

William A. Bedford, Jr., North Scituate, Mass., assignor to United-Carr Fastener Corporation, Cambridge, Mass., a corporation of Massachusetts Application May 7, 1949, Serial No. 92,018

1 Claim. (Cl. 85—9)

The present invention relates to T bolt fastener installations such as are used for securing molding and other objects to a wall, panel or the like, and aims generally to improve existing installations and fasteners of this type.

A primary object of the invention is the provision of a simplified and improved T bolt fastener construction adapted for attachment to an apertured support.

A further object of the invention is the provision of a T bolt fastener assembly in which the T bolt has a swivel connection with the clamping member to render it more universally applicable to supporting walls, panels, and the like, of varying shapes wherein the T bolt is required to assume an angular position with respect to the clamping plate to either side of the perpendicular position normally occupied.

A still further object of the invention is the provision of a T bolt fastener assembly comprising a clamping member and a T bolt member swingably secured together to permit mounting the assembly with the T bolt disposed at varying angles to the clamping member.

These and other objects and advantages of the invention will be apparent to persons skilled in the art from a consideration of the attached drawings and annexed specification illustrating and describing a preferred embodiment of the invention.

In the drawings—

Fig. 1 is a top plan view of the fastener assembly;

Fig. 2 is a side view thereof;

Fig. 3 is an end view thereof;

Fig. 4 is a cross-sectional view thereof taken on the line 4—4 of Fig. 1;

Fig. 5 is a bottom view thereof;

Fig. 6 is a side view of the T bolt;

Fig. 7 is an end view of the T bolt; and

Fig. 8 is a cross-sectional view of the assembly as applied in securing a molding to a body panel.

Referring to the drawings, the improved fastener assembly comprises a frame or clamping member 10 adapted to engage an object to be secured ot a support and a cooperating T bolt or screw 11 adapted to pierce the support and be secured thereto by a suitable nut member 12.

The T bolt 11 has a threaded shank portion 13 for engagement with a nut member as aforesaid and a head portion 14 for engagement with the clamping member 10. In accordance with the present invention the head portion 14 comprises an elongated body portion 15 having a substantially flat top 16 and convexly curved bottom portions 17 and 18 extending to either side of the shank portion 13. The curved bottom portions 17 and 18 are preferably formed as arcs of circles which extend upwardly on either side to join the flat side portions 19 and 20 or alternatively may extend upwardly on either side to join the flat top 16, in which case the flat side portions merge with the curved portions.

The frame or clamping member 10 is preferably formed from a strip of suitable sheet material such as metal or the like and comprises a substantially flat body portion 21 having portions thereof pressed out to form ribs 22 and 23 for added strength and rigidity and laterally extending flanges 24 and 25 curved on their outer edges as shown for engagement with the inner surface of a piece of molding or the like to be secured to a support. Substantially centrally thereof the body portion 21 is provided with an elongated depressed portion or groove 26 concavely curved, as shown at 27, to receive the head portion 14 of the T bolt 11. An opening 28 extends through the depressed portion 26 substantially midway between the ends thereof for receiving the threaded shank portion 13 of the T bol 11 and is somewhat larger than shank portion 13 to permit swivelling movement of the T bolt as will be more apparent hereinafter.

The T bolt 11 is retained in assembled relation with the clamping member 10 by a flange 29 which overlies the head of the bolt, as shown more clearly in Fig. 4. The flange 29 is preferably formed by making parallel cuts along the lines 30 and 31 in Fig. 1 to form a struck-out portion and then bending the struck-out portion between the cuts upwardly and rearwardly over the head of the bolt.

As will be apparent from Fig. 4, the T bolt assembly of this invention is so designed that the T bolt may be swung or swivelled in its mounting so as to occupy an operative position up to approximately a 20 degree angle on either side of its normal perpendicular position. This is made possible by the cooperating curved surfaces of the bolt head 14 and the depressed portion 26 and by the enlarged opening 28. Thus the T bolt may be secured in operative positions at varying angles to the clamping member and regardless of the particular angle within the limits disclosed will be properly seated to perform its intended function.

In Fig. 8 I have shown my improved fastener device as it is applied in holding a piece of molding on the body panel of an automobile or like device. A portion of the body panel indicated by the numeral 32 is provided with an opening 33 to receive the shank portion 13 of the T bolt. The edges of the clamping member 10 engage the inturned edges 34 and 35 of the molding 36 and clamp them to the body panel. The outer curved edges of the flanges 24 and 25 engage the inner surface of the molding 36 and assist in retaining the shape thereof. The flanges 24 and 25 likewise add strength and rigidity to the clamping member.

In the particular application shown a reinforcing yoke 37 is utilized to secure the desired clamping action. The yoke 37 has leg portions 38 and 39 provided with flanges 40 and 41 for engagement with the body panel 32 and a bridge portion 42 provided with an opening 43 to receive the shank portion 13 of the T bolt. A nut 12 screw-threadedly engaged with the shank portion 13 bears against the bridge portion 42 and secures the fastener assembly and the molding to the body panel 32.

The fastener assembly of the present invention is particularly designed for securing strips of shaped molding to the body panels of automobiles and the like, but is generally applicable to a wide variety of uses as will be apparent to those skilled in the art.

Various modifications of the invention described and illustrated will most likely occur to those skilled in the art to which the invention relates and may be made without departing from the spirit of the invention, the scope of which is indicated in the attached claim.

I claim:

A two-piece molding fastener device comprising a clamping member and a stud member, said stud member comprising an elongated threaded shank portion and a head portion at one end of said shank portion, said head portion having oppositely disposed laterally extending arm portions, said clamping member being formed from a single piece of sheet material and comprising a substantially flat base portion providing surfaces on one face thereof adjacent opposite side edges for engagement with the inner faces of opposed inturned flanges of a molding strip and flanges extending from the end edges of said base portion substantially normal to the face thereof opposite said one face, said base portion having a pair of transversely disposed elongated embossments and a longitudinally disposed elongated embossment, said transverse embossments being disposed adjacent opposite ends of said base portion and extending from said opposite face of said base portion, said longitudinal embossment being centrally disposed on said base portion and extending from said one face thereof, said longitudinal embossment having a centrally disposed aperture and providing a groove in the opposite face of said base portion with concave surfaces, said stud member being disposed with the head portion thereof in said groove with the arm portions disposed on opposite sides of said aperture and with the shank portion extending through said aperture, said arm portions having convex curved surfaces cooperating with the concave curved surfaces of said groove to permit movement of said shank portion in a plane substantially normal to said base portion and to said longitudinal embossment to dispose said shank portion at different angular positions with respect to said clamping member, said clamping member including a tongue cut from the material of said base portion and formed to overlie said groove to retain the head of said stud member in said groove and thereby to retain said stud and clamping members in assembly.

WILLIAM A. BEDFORD, Jr.

References Cited in the file of this patent

UNITED STATES PATENTS

| Number | Name | Date |
|---|---|---|
| 517,885 | Pratt | Apr. 10, 1894 |
| 570,368 | Beith | Oct. 27, 1896 |
| 1,199,743 | Gadd | Sept. 26, 1916 |
| 1,564,789 | Himmel et al. | Dec. 8, 1925 |
| 1,589,063 | Fondo | June 15, 1926 |
| 1,613,906 | Rohour | Jan. 11, 1927 |
| 1,985,333 | Wiley | Dec. 25, 1934 |
| 2,217,389 | Steger | Oct. 8, 1940 |